(12) United States Patent
Parduhn

(10) Patent No.: US 9,200,654 B1
(45) Date of Patent: Dec. 1, 2015

(54) MOUNTING BRACKET FOR TRAFFIC CONTROL DEVICE

(75) Inventor: A. Philip Parduhn, Edmond, OK (US)

(73) Assignee: PELCO PRODUCTS, INC., Edmod, OK (US)

( * ) Notice: Subject to any disclaimer, the term of this patent is extended or adjusted under 35 U.S.C. 154(b) by 1467 days.

(21) Appl. No.: 12/360,619

(22) Filed: Jan. 27, 2009

Related U.S. Application Data

(60) Provisional application No. 61/024,064, filed on Jan. 28, 2008.

(51) Int. Cl.
*F16B 7/04* (2006.01)

(52) U.S. Cl.
CPC .................................. F16B 7/0493 (2013.01)

(58) Field of Classification Search
USPC .......... 248/218.4, 219.1, 219.4, 230.1, 230.8, 248/230.9, 229.2
See application file for complete search history.

(56) References Cited

U.S. PATENT DOCUMENTS

| | | | |
|---|---|---|---|
| 1,682,693 A | 8/1928 | Day | |
| 1,985,951 A | 1/1935 | Rickterkessing | |
| 2,038,117 A | 4/1936 | Layton | |
| 2,124,006 A | 7/1938 | Parker | |
| 2,498,590 A | 2/1950 | Strauss | |
| 2,942,366 A * | 6/1960 | Pfaff, Jr. et al. | 40/624 |
| 3,107,932 A * | 10/1963 | Johnson et al. | 403/176 |
| 3,142,501 A | 7/1964 | Clark et al. | |
| 3,227,406 A * | 1/1966 | Shelton et al. | 248/74.4 |
| 3,347,572 A * | 10/1967 | Pfaff, Jr. et al. | 403/27 |
| 3,605,214 A * | 9/1971 | Spotts et al. | 24/277 |
| 3,729,782 A * | 5/1973 | Downing | 24/277 |
| 3,888,446 A * | 6/1975 | O'Brien et al. | 362/431 |
| 3,917,205 A * | 11/1975 | Meadors | 248/229.17 |
| 4,079,487 A * | 3/1978 | Coop, Sr. | 24/277 |
| 4,101,191 A | 7/1978 | Gould et al. | |
| 4,142,173 A | 2/1979 | Gould et al. | |
| 4,148,456 A | 4/1979 | Garchinsky | |
| 4,167,033 A | 9/1979 | Fletcher | |
| 4,265,005 A * | 5/1981 | Heckethorn | 24/277 |
| 4,407,050 A * | 10/1983 | Offterdinger | 24/277 |
| 4,447,750 A | 5/1984 | Howlett et al. | |
| 4,460,124 A * | 7/1984 | Chalmin et al. | 236/48 R |
| 4,460,142 A * | 7/1984 | O'Rorke | 248/230.8 |
| 4,489,910 A * | 12/1984 | Ferguson | 248/219.4 |
| 4,500,064 A * | 2/1985 | Calabro | 248/539 |
| 4,659,046 A | 4/1987 | Parduhn | |

(Continued)

OTHER PUBLICATIONS

Gordon Andersen et al.(inventors),"Mounting Assembly for Traffic Cameras and Other Traffic Control Devices," unpublished U.S. Appl. No. 12/111,400, filed Apr. 29, 2008.

*Primary Examiner* — Jonathan Liu
(74) *Attorney, Agent, or Firm* — Mary M. Lee

(57) ABSTRACT

A mounting bracket assembly for supporting a traffic control device on a mast arm or pole. The bracket includes a first clamp adapted to removably attach to the mast arm or pole or other elongate support, and is designed to be positioned vertically or horizontally. A second clamp is removably attachable to pole or other elongate support member supporting the traffic control device. The second clamp includes inner and outer clamp members. The inner member has a pair of arcuate slots that are alignable with either of two pairs of bolt holes in the first clamp. Thus, the arcuate slots in the inner clamp member and the first and second pairs of bolt holes in the first clamp permit rotation of the inner clamp member 360 degrees relative to the first clamp.

16 Claims, 7 Drawing Sheets

(56) References Cited

U.S. PATENT DOCUMENTS

| | | | |
|---|---|---|---|
| 4,691,884 A | 9/1987 | Parduhn | |
| 4,736,921 A * | 4/1988 | Zane et al. | 248/316.2 |
| 4,860,985 A * | 8/1989 | Olson et al. | 248/229.17 |
| 4,917,338 A * | 4/1990 | Olson et al. | 248/229.17 |
| 4,927,103 A * | 5/1990 | Nicholson | 248/62 |
| 4,993,670 A * | 2/1991 | Tesar | 248/68.1 |
| 5,069,416 A | 12/1991 | Ennis | |
| 5,105,350 A | 4/1992 | Tolman et al. | |
| D328,243 S | 7/1992 | Parduhn | |
| 5,181,774 A * | 1/1993 | Lane | 362/549 |
| D335,279 S | 5/1993 | Parduhn | |
| 5,215,281 A * | 6/1993 | Sherman | 248/74.1 |
| 5,274,888 A * | 1/1994 | Payne | 24/277 |
| 5,299,111 A | 3/1994 | Parduhn et al. | |
| 5,299,773 A | 4/1994 | Bertrand | |
| 5,340,069 A * | 8/1994 | Niemeyer | 248/214 |
| 5,395,018 A * | 3/1995 | Studdiford | 224/420 |
| 5,468,092 A * | 11/1995 | Saunders | 403/385 |
| 5,504,481 A | 4/1996 | Wys | |
| D373,947 S | 9/1996 | Parduhn | |
| 5,566,916 A * | 10/1996 | Bailey | 248/230.1 |
| D379,756 S | 6/1997 | Parduhn | |
| 5,645,255 A | 7/1997 | Parduhn | |
| 5,673,889 A * | 10/1997 | DeValcourt | 248/229.17 |
| 5,687,938 A * | 11/1997 | Bailey | 248/74.1 |
| 5,865,406 A | 2/1999 | Teeple | |
| 6,106,189 A * | 8/2000 | Seale | 403/398 |
| 6,204,446 B1 | 3/2001 | Parduhn | |
| 6,262,691 B1 * | 7/2001 | Austin et al. | 343/890 |
| 6,357,709 B1 * | 3/2002 | Parduhn | 248/229.17 |
| 7,104,610 B2 * | 9/2006 | Cramer | 297/440.2 |
| 7,258,314 B1 | 8/2007 | Parduhn et al. | |
| 7,272,204 B2 * | 9/2007 | Jensen | 376/260 |
| 7,404,532 B1 * | 7/2008 | Baril | 248/218.4 |
| 7,523,912 B1 | 4/2009 | Woods | |
| 7,601,928 B1 | 10/2009 | Magness et al. | |
| 2002/0096610 A1 * | 7/2002 | Fernandez | 248/218.4 |
| 2004/0061032 A1 * | 4/2004 | Bradford et al. | 248/218.4 |
| 2005/0178936 A1 * | 8/2005 | Chen | 248/230.1 |
| 2005/0269465 A1 * | 12/2005 | Carnevali | 248/219.4 |
| 2006/0231706 A1 * | 10/2006 | Wyatt | 248/218.4 |
| 2007/0235607 A1 * | 10/2007 | Liaw et al. | 248/218.4 |
| 2007/0241248 A1 * | 10/2007 | Carnevali | 248/219.4 |
| 2008/0245938 A1 * | 10/2008 | Qualy et al. | 248/218.4 |
| 2008/0272125 A1 * | 11/2008 | Crow et al. | 220/475 |
| 2008/0272254 A1 * | 11/2008 | Harr et al. | 248/218.4 |

\* cited by examiner

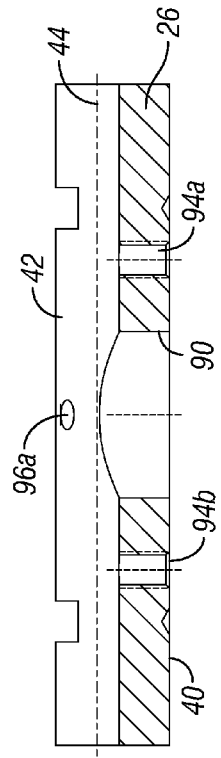
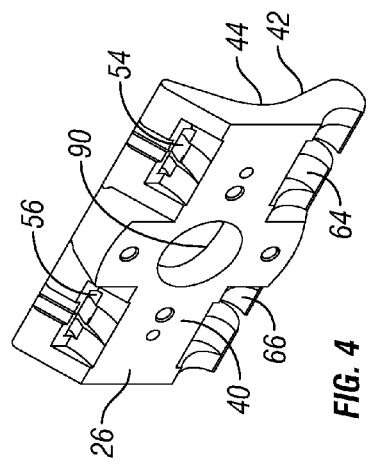
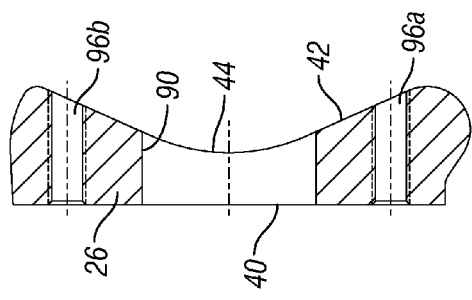
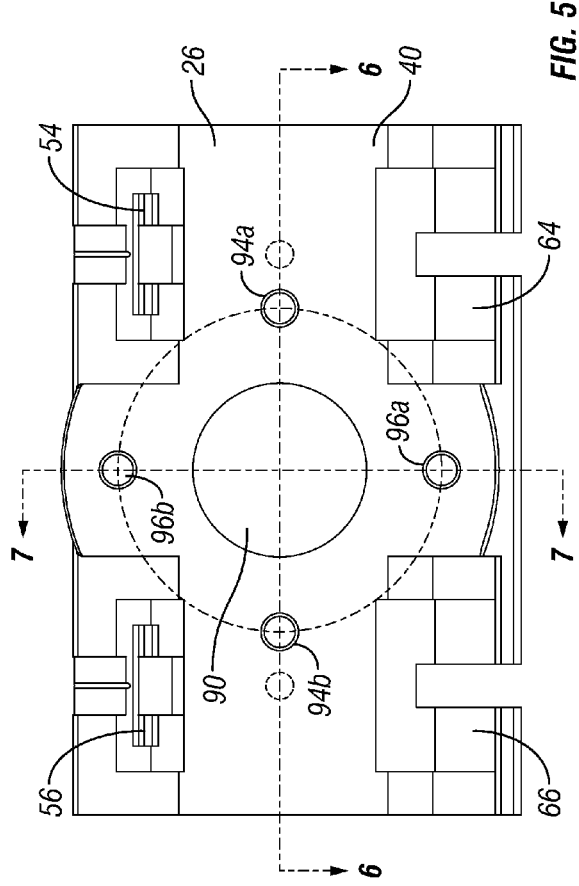

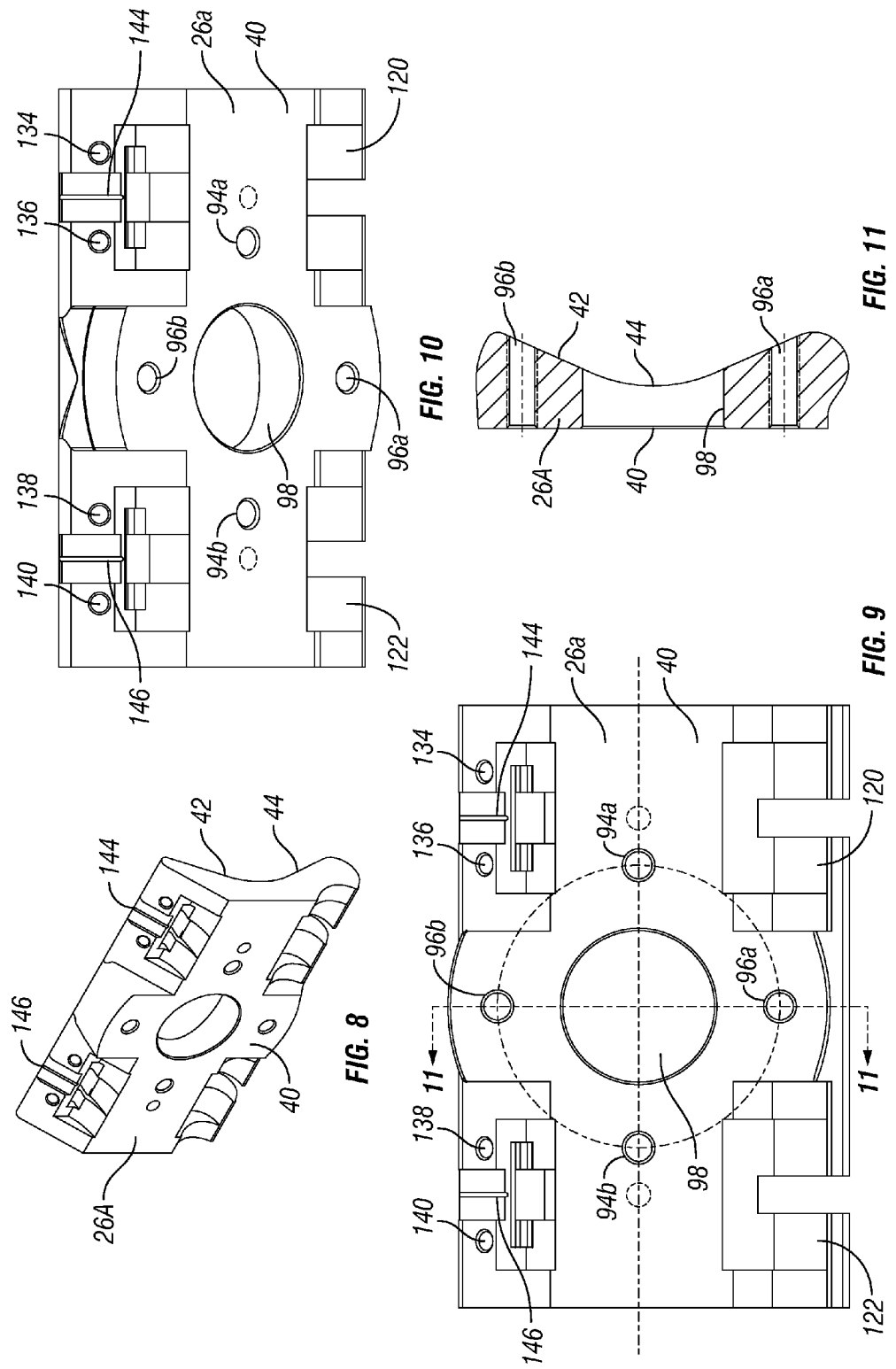

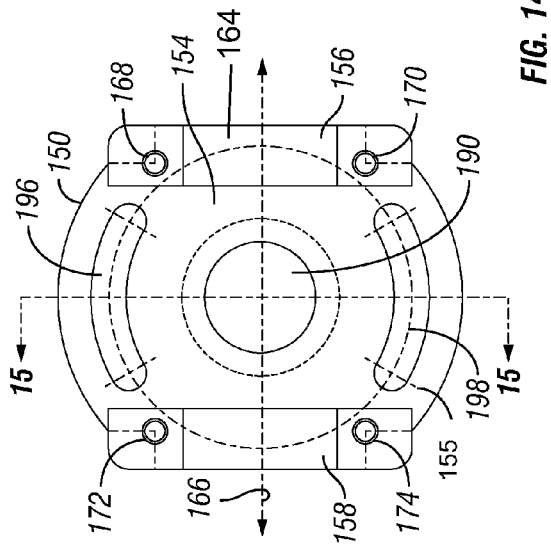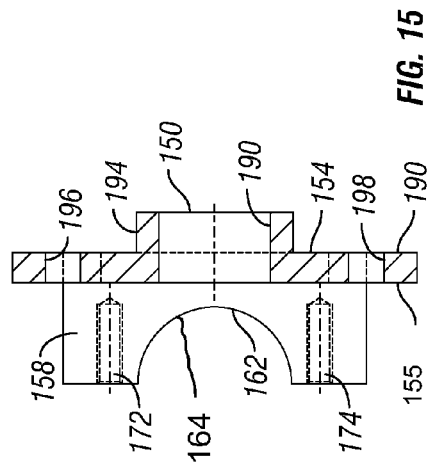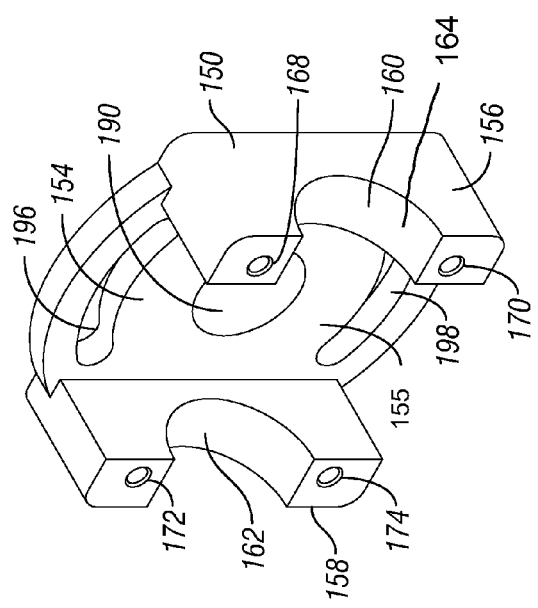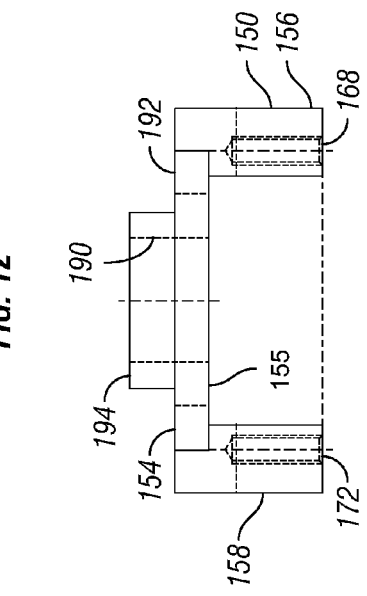
FIG. 12
FIG. 13
FIG. 14
FIG. 15

MOUNTING BRACKET FOR TRAFFIC CONTROL DEVICE

This application claims the benefit of provisional application Ser. No. 61/024,064, filed Jan. 28, 2008, entitled "Mounting Bracket for Traffic Control Device," the contents of which are incorporated herein by reference.

FIELD OF THE INVENTION

The present invention relates to traffic control devices generally and to mounting brackets for such devices in particular.

BRIEF DESCRIPTION OF THE DRAWINGS

FIG. 2A shows a preferred tie-back assembly for use with the cable-mount bracket.

FIG. 4 is a frontal perspective view of the band-mounted first clamp (anchor plate) shown in FIG. 1.

FIG. 5 is a front elevational view of the band-mounted first clamp of FIG. 8.

FIG. 6 is a longitudinal sectional view taken along line 6-6 in FIG. 5.

FIG. 7 is a cross-sectional view of the first clamp of FIG. 4 taken along line 7-7 of FIG. 5.

FIG. 8 is a frontal perspective view of the cable-mounted first clamp (anchor plate) shown in FIG. 2.

FIG. 9 is a front elevational view of the cable-mounted first clamp of FIG. 8.

FIG. 10 is an elevational view of the first clamp in FIG. 8 taken at an angle to the front showing the recesses to which the ends of the cable connector are attached.

FIG. 11 is a cross-sectional view of the first clamp of FIG. 8 taken along line 11-11 of FIG. 9.

FIG. 12 is a frontal perspective view of the inner clamp member of the second clamp of the mounting bracket shown in FIG. 1.

FIG. 13 is plan view of the inner clamp member of FIG. 12.

FIG. 14 is a front elevational view of the inner clamp member.

FIG. 15 is a longitudinal sectional view of the inner clamp member taken along line 15-15 of FIG. 14.

DETAILED DESCRIPTION OF THE PREFERRED EMBODIMENTS

Figure 1:
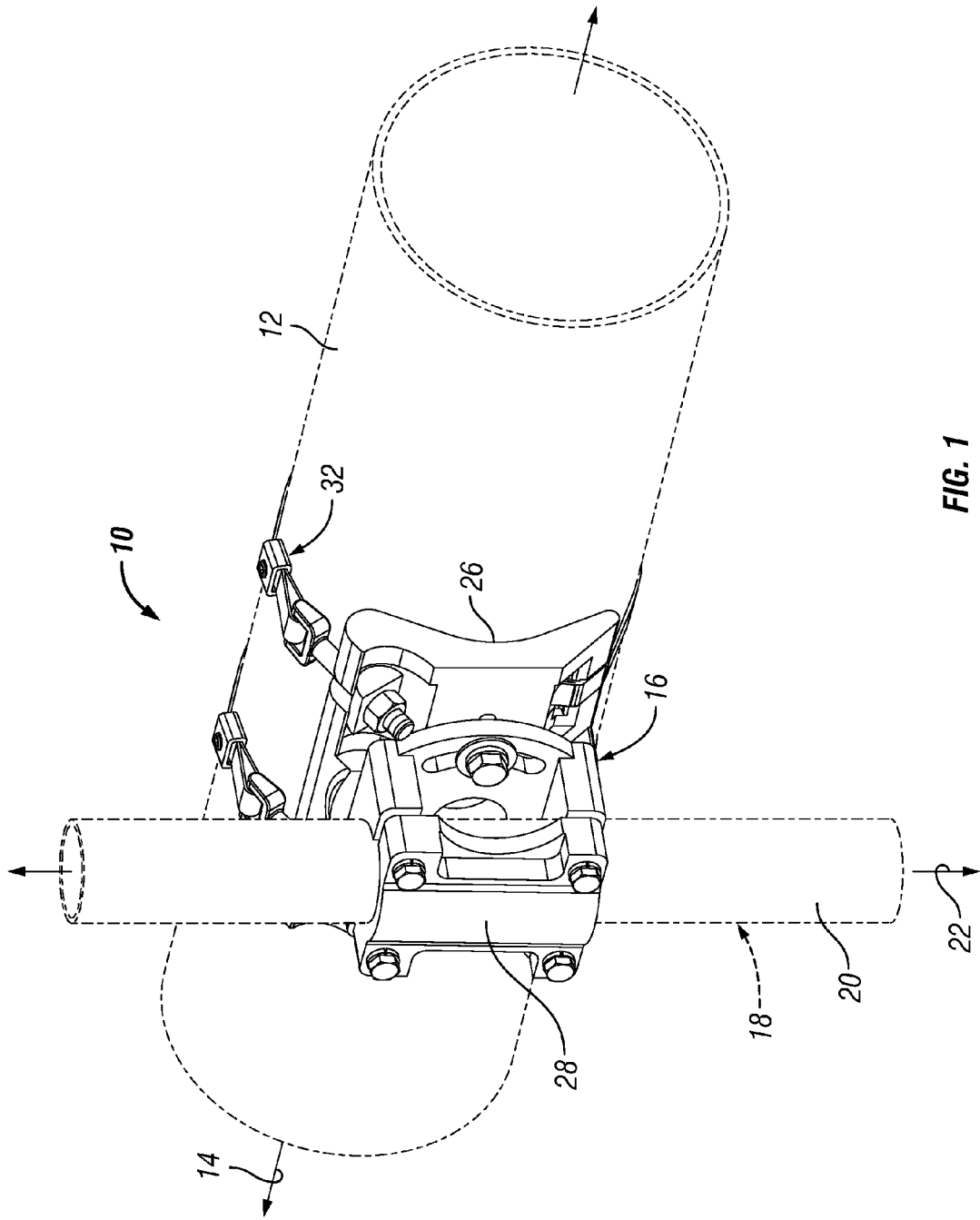
FIG. 1 is a perspective view of an assembled mounting bracket constructed in accordance with the present invention. The first clamp is a band-mounted anchor plate. The mast arm, to which the anchor plate is attached, is shown in broken lines, as is the vertical member that supports the traffic control device.

Turning now to the drawings in general and to FIG. 1 in particular, there is shown therein a traffic device assembly made in accordance with a preferred embodiment of the present invention and designated generally by the reference numeral 10. The traffic device assembly 10 includes a first elongate support such as the mast arm 12, which extends generally horizontally. Alternately, the first support may be a vertical pole, such as a traffic pole or other support structure. The first support has a longitudinal axis indicated at 14.

Also included in the assembly 10 is a mounting bracket designated generally at 16 and a traffic control device of some sort. The traffic control device 18 comprises a second elongate support 20 that has a longitudinal axis indicated at 22. As used herein, "traffic control device" includes traffic signs and signals, cameras, antennas, sensors, monitors, signs, junction boxes, wireless devices, microwave transmission devices, and any other device useful in the monitoring or control of pedestrian or vehicular traffic.

With continued reference to FIG. 1, the mounting bracket 16 comprises a first clamp 26 and a second clamp 28. The first clamp 26 is removably attachable to the mast arm 12 or other first support. The second clamp 28 is removably attachable to the second elongate support 18 of the traffic control device.

Figure 2:
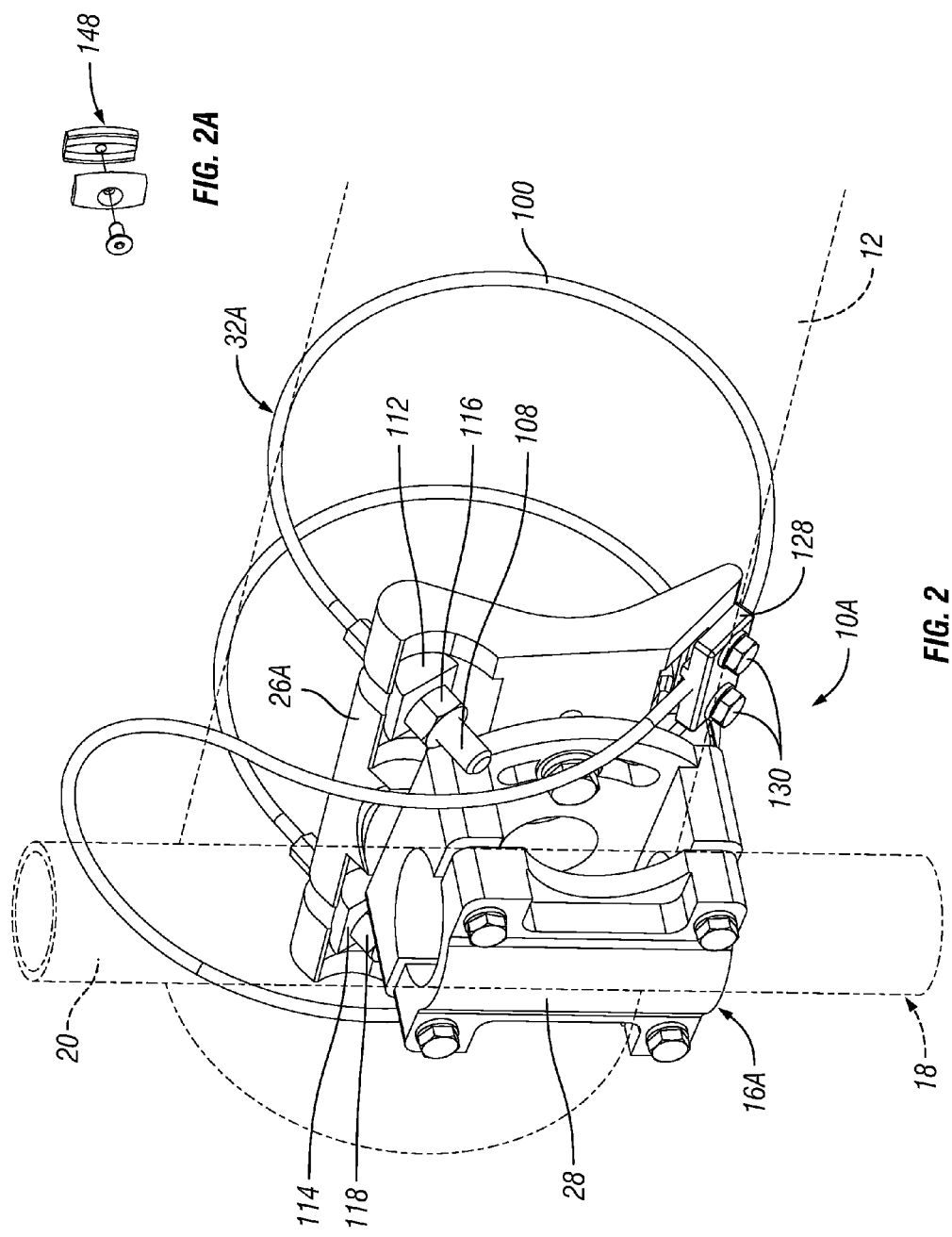
FIG. 2 is a perspective view of an assembled mounting bracket constructed in accordance with the present invention. The first clamp is a cable-mounted anchor plate. The mast arm, to which the anchor plate is attached, is shown in broken lines, as is the vertical member that supports the traffic control device.

The first clamp 26 may be attached to the mast arm 12 in any suitable manner. Preferably, the first clamp 26 comprises a connector assembly 32. One preferred connector assembly 32 is the band assembly shown in FIG. 1, which comprises two or more flat, flexible metal bands. FIG. 2 shows a second embodiment of the traffic device assembly, designated as 10A. In this second embodiment, the connector assembly 32A of the first clamp 26A comprises a cable assembly consisting of a flexible metal cable. In other respects, the mounting bracket 16A is similar to the bracket 16 of FIG. 1.

Turning now to the exploded view of FIG. 3, the mounting bracket 16 will be described in more detail. The first clamp 26, further illustrated in FIGS. 4-7, has a front face 40 and a rear face 42. The rear face 42 has a longitudinal support-receiving recess 44 (FIG. 7) configured to receive a section of the first support 12. To that end, the recess 44 has an elongate curved or angled shaped that will engage most standard mast arms and poles used in the traffic industry. In this way, when the first clamp 26 is attached to the first support 12, the support-receiving recess 44 is generally parallel to the longitudinal axis 14 (FIG. 1) of the first support.

Figure 3:
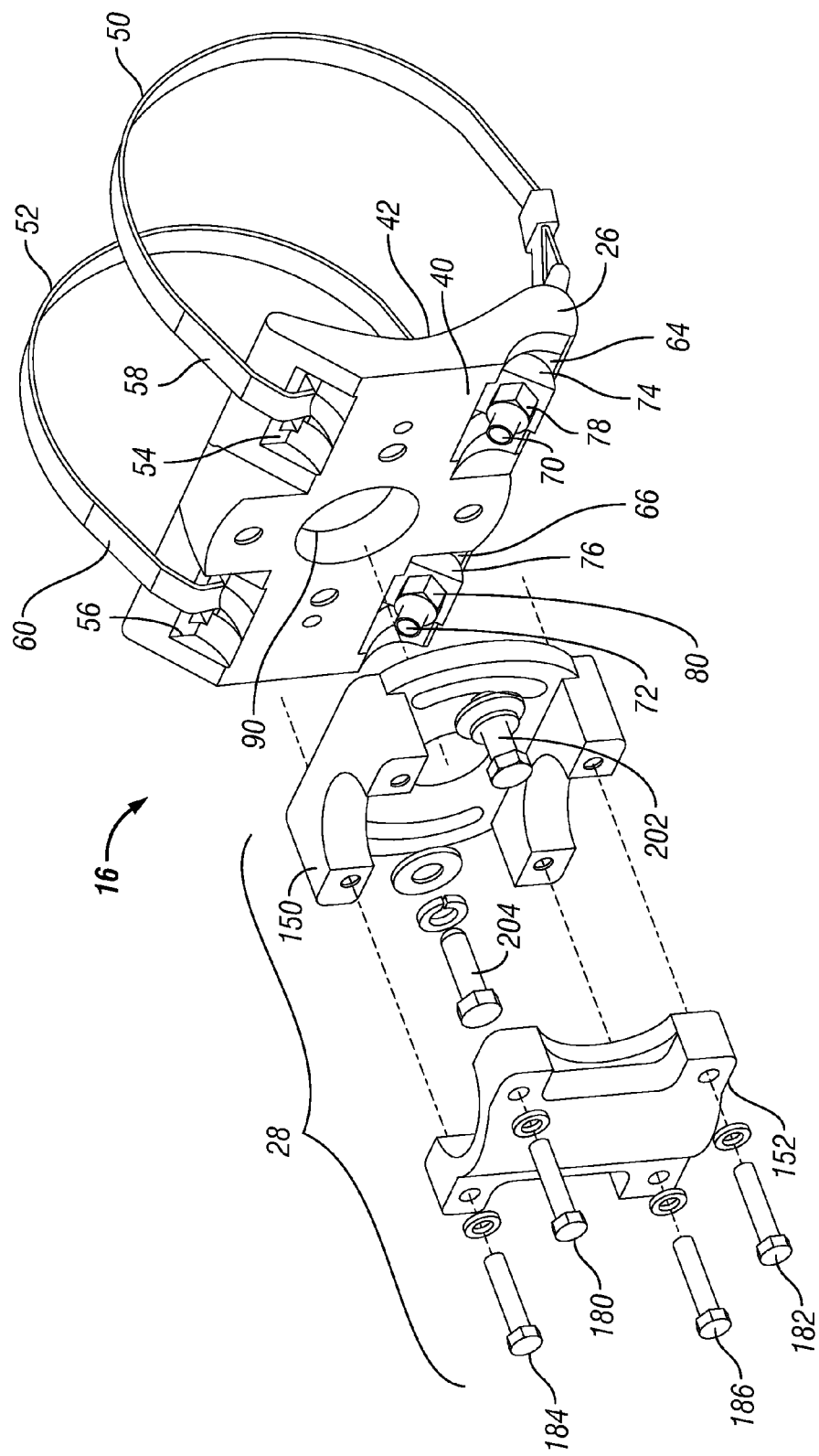
FIG. 3 is an exploded perspective view of the band-mounted bracket of FIG. 1.

The first clamp 26 is provided with bands 50 and 52 (FIG. 3). The bands 50 and 52 attach to the first clamp 26 in a known manner, which will not be described in detail herein. Briefly, one side of the clamp 26 has pin-receiving notches 54 and 56 (FIGS. 4 & 5) for receiving groove pins (not shown) placed through the looped ends 58 and 60 of the bands 50 and 52. The other side of the clamp 26 has recesses 64 and 66 for receiving clamp screws 70 and 72 and tightening collars 74 and 76, and nuts 78 and 80 (FIG. 4) for connecting the other ends 84 and 86 of the bands 50 and 52 to the clamp 26, and to permit tightening of the bands.

The first clamp 26 includes a wire access opening 90, usually centered in the body of the clamp. The wire access opening 90 is sized to accommodate the wires necessary to operate the traffic signal 18.

As best shown in FIGS. 5 and 6, the first clamp 26 further includes first and second pairs of bolt holes, 94a and 94b and 96a and 96b. Bolt holes 94a and 94b in the first pair 94 are positioned on opposition sides of the wire access opening 90 and are aligned with the longitudinal axis 14 (FIG. 1). The holes 96a and 96b in the second pair 96 also are on opposite sides of the wire access opening 90 and are perpendicular to the first pair 94 of holes 94a and 94b.

Turning now to FIGS. 2 and 8-11, the second embodiment of the first clamp 26A will be described. In this embodiment, the connector assembly 32A comprises a length of flexible metal cable 100. The ends 100 and 102 the cable 100 are attached to the first clamp 26A by cable bolts 108 (only one seen in FIG. 2) with tightening collars 112 and 114 and nuts 116 and 118 to permit tightening of the cable 100. The collars 112 and 114 are received in recesses 120 and 122 in one side of the clamp 26A.

With the cable 100 is looped around the first support 12 (mast arm), sections of the cable are secured to the other side of the clamp 26A by clamp plates 128 (only one seen in FIG. 2) fixed to the clamp with bolts 130, 132 (only two seen in FIG. 2) received in bolts holes 134, 136, 138 and 140 (FIGS. 9-10). Grooves 144 and 146 may be provided to receive the sections of the cable 100. A tie-back restraining clamp 148 assembly, shown in FIG. 2A, may be provided to restrain the loop of cable 100 extending between the clamp plates 128. As illustrated by FIGS. 4-11, it is feasible and advantageous to make a single clamp body that incorporates the attachment features of both the cable and band connectors described above.

With continuing reference to FIGS. 1 and 3, and referring also to FIGS. 12-19, the second clamp 28 will be described. As best seen in FIG. 2, the second clamp 28 comprises an inner clamp member 150 and an outer clamp member 152 and a plurality of bolts to clamp the two members together around the second support 20 of the traffic control device 18 (FIG. 1).

The inner clamp member 150 is illustrated in FIGS. 12-15. As best seen in FIG. 12, the preferred form for the clamp member 150 is a planar center section 154 having an inner surface 155 with two outwardly extending side sections 156 and 158 each forming a curved or arcuate recess 160 and 162, the two curved or arcuate recesses together forming a front face 164 with a saddle configuration that defines a longitudinal axis at 166 (FIG. 14). Corner bolts holes 168, 170, 172 and 174 are provided in the ends of the side sections 156 and 158, a corner bolt hole being adjacent each side of each arcuate recess. As shown in FIGS. 13 and 15, the bolt holes comprises blind bores that are tapped or threaded. Corner bolts 180, 182, 184 and 186 (FIG. 3) are included with the second clamp 28, the bolts being sized for the corner bolt holes 168, 170, 172 and 174, as will be explained more fully below.

Centered in the center section 154 is a wire access opening 190. The rear face 192 of the inner clamp member 150 may be provided with a collar 194 extending rearwardly around the wire access opening 190. The collar 194 is sized to be received inside the wire access opening 98 in the first clamp 26 (and 26A). In this way, when the rear face 192 of the inner clamp member 150 of the second clamp 28 abuts the front face 40 of the first clamp 26, the collar 194 will act as a pivot support.

Also provided in the center section 154 of the inner clamp member 150 are first and second arcuate slots 196 and 198 preferably positioned on opposite sides of the wire access opening 190. As best seen in FIG. 3, the arcuate slots 196 and 198 are sized and positioned to align alternately with one of the first and second pairs 94, 96 of bolts holes 94a, 94b, 96a, and 96b in the first clamp 26. A plurality of bolts, such as the pair of bolts 202 and 204 (FIG. 3) are included in the mounting bracket 16 for attaching the inner clamp member 150 to the first clamp 26 (and 26A) through the arcuate slots 196 and 198 and one of the first and second pairs 94, 96 of bolts holes 94a, 94b, 96a, and 96b.

Figure 18:
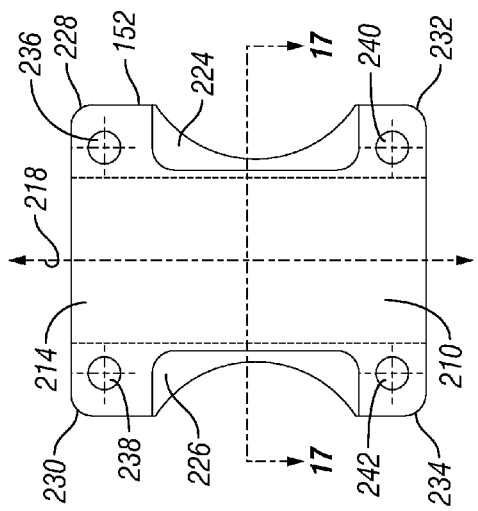
FIG. 18 is a front elevational view of the outer clamp member.
Figure 19:
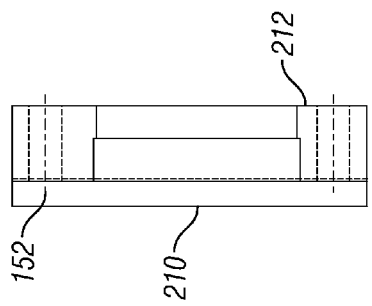
FIG. 19 is a side elevational view of the outer clamp member shown in FIG. 16.
Figure 16:
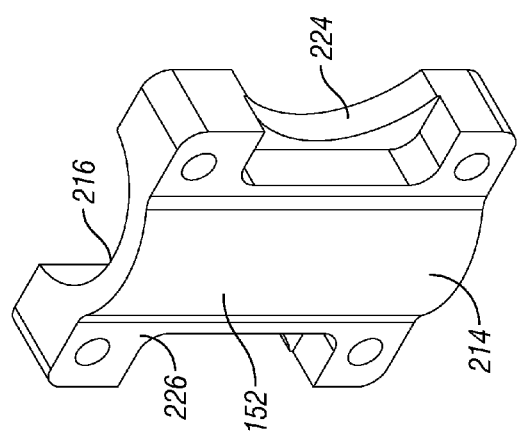
FIG. 16 is a frontal perspective view of the outer clamp member of the second clamp of the mounting bracket shown in FIG. 1.
Figure 17:
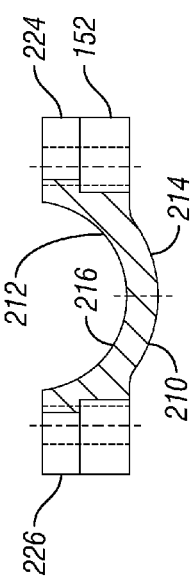
FIG. 17 is cross-sectional view of the outer clamp member taken along line 17-17 of FIG. 18.

Referring still to FIG. 3 and now also to FIGS. 16-19, the outer clamp member 152 will be described in more detail. Preferably, the outer clamp member 152 is integrally formed, although multiple parts may be used instead. In its preferred form, the outer clamp member 152 comprises a front face 210 and a rear face 212. As best seen in FIG. 16, the preferred form for the outer clamp member 152 is an elongate center section 214 that is curved or arcuate along its length, forming a support-receiving channel 216 along its longitudinal axis 218 (FIG. 18). The outer clamp member 152 is configured so that the arcuate center section 214 opposes the two curved or arcuate recesses 160 and 162 in the front face 164 of the inner clamp member 150.

Flanking the center section 214 are two outwardly extending side sections 224 and 226, each having a first end 228 and 230 and a second end 232, 234. Corner bolts holes 236, 238, 240 and 242 are provided, one in each end 228, 230, 232, and 234 of the side sections 224 and 226. The corner bolts holes 236, 238, 240 and 242 are sized to receive the above-described corner bolts 180, 182, 184 and 186 (FIG. 3).

As shown best in FIG. 3, the front face 164 of the inner clamp member 150 and the rear face 212 of the outer clamp member 152, when abutted to each other, form a generally tubular shaped area configured to receive longitudinally opposite sides of a section of the second support 20 of the traffic control device 18 so that the longitudinal axes 166 and 218 of the inner and outer clamp members 150 and 152 are generally parallel to the longitudinal axis 22 of the second elongate support 20. When connected to each other, the inner and outer clamp members 150 and 152 securely support the traffic control device 18.

Having described the structure of the mounting bracket, its preferred use will be explained. The inner clamp member 150 of the second clamp 28 is loosely attached to the first clamp 26 using the bolts 202 and 204. The first clamp 26 is attached to the first support 12, such as a mast arm, using the bands 50 and 52 (FIGS. 1 and 3) or the cable 100 (FIG. 2). The inner clamp 150 is rotated on the first camp 26 so that the longitudinal axis 166 (FIG. 14) is aligned vertically or horizontally, depending on the desired orientation of the traffic control device 18. Next, the second elongate support 20 of the traffic control device 18 is placed in the recesses 160 and 162 of the inner clamp member 150 and the outer clamp member 152 is secured in place using the bolts 180, 182, 184, and 186 (FIG. 3).

Now it will be appreciated that adjustment bolts and the arcuate slots in the inner clamp member and the first and second pairs of bolt holes in the first clamp are configured to permit rotation of the inner clamp member 360 degrees relative to the first clamp. This allows the mounting bracket to accommodate virtually any horizontal or vertical position of the mast arm or traffic pole, as well as any vertical or horizontal position of the second support in the traffic control device.

The embodiments shown and described above are exemplary. Many details are often found in the art and, therefore, many such details are neither shown nor described herein. It is not claimed that all of the details, parts, elements, or steps described and shown were invented herein. Even though numerous characteristics and advantages of the present inventions have been described in the drawings and accompanying text, the description is illustrative only. Changes may be made in the details, especially in matters of shape, size, and arrangement of the parts within the principles of the inventions. The description and drawings of the specific embodiments herein do not point out what an infringement of this patent would be, but rather provide an example of how to use and make the invention.

What is claimed is:

1. A mounting bracket for mounting a traffic control device to a first elongate support having a longitudinal axis, the traffic control device comprising a second elongate support having a longitudinal axis, the mounting bracket comprising:

a first clamp removably attachable to the first elongate support, the first clamp comprising a front face and a rear face, wherein the rear face has a longitudinal support-receiving recess configured to receive a section of the first elongate support so that when the first clamp is attached to the first elongate support the support-receiving recess is generally parallel to the longitudinal axis of the first elongate support, wherein the first clamp includes a wire access opening, and wherein the first clamp includes first and second pairs of bolt holes, the first pair aligned with longitudinal axis of the rear face and the second pair perpendicular to the first pair;

a second clamp removably attachable to the second elongate support, the second clamp comprising:

an inner clamp member having a longitudinal axis and comprising a front face and a rear face, wherein the front face of the inner clamp member defines two spaced apart arcuate recesses, wherein the inner clamp member includes a threaded corner bolt bore adjacent each side of each arcuate recess, wherein the rear face is configured to abut the front face of the first clamp, wherein the inner clamp defines a wire access opening and first and second arcuate slots, wherein when the rear face of the inner clamp member abuts the front face of the first clamp the wire access opening in the inner clamp member is aligned with the wire access opening in the first clamp and the first and second arcuate slots are aligned alternately with one of the pairs of bolt holes in the first clamp;

an outer clamp member having a longitudinal axis and comprising a rear face, wherein the rear face of the outer clamp member defines an elongate arcuate support-receiving channel opposing the arcuate recesses in the inner clamp, wherein the outer clamp member further comprises two side members, one on each side of the elongate arcuate channel, each side member having a first and second end, wherein the outer clamp member includes a corner bolt hole in each of the first and second ends of both the side members, wherein the four corner bolt holes in the outer clamp member are alignable with the four corner bolt bores in the inner clamp member, and wherein the outer clamp member is integrally formed;

wherein the front face of the inner clamp member and the rear face of the outer clamp member are configured to receive opposite sides of a section of the second elongate support longitudinally so that the longitudinal axis of the inner and outer clamp members are generally parallel to the longitudinal axis of the second elongate support and being connectable to each other to attach the mounting bracket to the second elongate support so that rotation of the second elongate support relative to the second clamp is prevented; and a plurality of bolts sized to connect the inner clamp member to the first clamp.

2. The mounting bracket of claim 1 wherein the first clamp further comprising a connector assembly adapted to secure the first clamp to the first elongate support.

3. The mounting bracket of claim 2 wherein the connector assembly comprises flat, flexible metal bands.

4. The mounting bracket of claim 2 wherein the connector assembly of the first clamp comprises flexible metal cables.

5. The mounting bracket of claim 1 wherein the first and second arcuate slots are on opposite sides of the wire access opening in the inner clamp member.

6. The mounting bracket of claim 1 wherein the first and second pairs of bolt holes are arranged on opposite sides of the wire access opening in the first clamp.

7. The mounting bracket of claim 1 wherein the front face of the inner clamp member defines two spaced apart arcuate recesses and wherein the rear face of the outer clamp member defines an elongate arcuate channel opposing the arcuate recesses in the inner clamp, together forming a tubular shaped area to engage longitudinally the second elongate support.

8. The mounting bracket of claim 7 wherein the rear face of the first clamp member defines an elongate recess running parallel to the longitudinal axis of the first clamp and configured to engage a portion of the first elongate support.

9. The mounting bracket of claim 1 wherein the second clamp further comprises a plurality of corner bolts each sized to be received in one of the corner bolt holes whereby the inner and outer clamp members are connectable to each other.

10. The mounting bracket of claim 1 wherein the arcuate slots in the inner clamp member and each of the first and second pairs of bolt holes in the first clamp are configured to permit rotation of the inner clamp member at least about 180 degrees relative to the first clamp.

11. The mounting bracket of claim 1 wherein the arcuate slots in the inner clamp member and the first and second pairs of bolt holes in the first clamp are configured to permit rotation of the inner clamp member 360 degrees relative to the first clamp.

12. A traffic device assembly comprising a first elongate support having a longitudinal axis, a traffic control device comprising a second elongate support having a longitudinal axis, and wherein the traffic control device is mounted to the first support with the bracket assembly of claim 1.

13. The traffic device assembly of claim 12 wherein the first elongate support is a mast arm extending horizontally.

14. The traffic device assembly of claim 12 wherein the first elongate support is a pole extending vertically.

15. The traffic device assembly of claim 12 wherein the second elongate support is horizontal.

16. The traffic device assembly of claim 12 wherein the second elongate support is vertical.

* * * * *

UNITED STATES PATENT AND TRADEMARK OFFICE
CERTIFICATE OF CORRECTION

PATENT NO. : 9,200,654 B1
APPLICATION NO. : 12/360619
DATED : December 1, 2015
INVENTOR(S) : A. Phillip Parduhn Page 1 of 1

It is certified that error appears in the above-identified patent and that said Letters Patent is hereby corrected as shown below:

On the Title Page:

Col 1, item 73 Assignee: replace "Edmod" with --Edmond--.
Col 2, item 56 Other Publications: replace "al.(inventors),"Mounting" with --al. (inventors), "Mounting--.
Col 2, item 57 Abstract, line 6: replace "to pole" with --to the pole--.

In the Specification:

Column 1, line 54: replace "is plan" with --is a plan--.
Column 1, line 62: replace "is cross-sectional" with --is a cross-sectional--.
Column 2, line 43: replace "shaped" with --shape--.
Column 2, line 65: replace "pair 94 are" with --pair are--.
Column 3, line 3: replace "pair 94 of" with --pair of--.
Column 3, line 7: replace "ends 100 and 102 the" with --ends of the--.
Column 3, line 13: replace "With the" with --When the--.
Column 3, line 16: replace "130, 132" with --130--.
Column 3, line 17: replace "bolts" with --bolt--.
Column 3, line 28: replace "FIG 2," with --FIG 3--.
Column 3, line 42: replace "comprises" with --comprise--.
Column 3, line 61: replace "pairs 94, 96 of bolts holes" with --pairs of bolt holes--.
Column 3, line 66: replace "pairs 94, 96 of bolts holes" with --pairs of bolt holes--.
Column 4, line 17: replace "232,234. Corner bolts holes" with --232 and 234. Corner bolt holes--.
Column 4, line 19: replace "corner bolts holes" with --corner bolt holes--.

Signed and Sealed this
Nineteenth Day of April, 2016

Michelle K. Lee
*Director of the United States Patent and Trademark Office*